(12) United States Patent
Nakayama et al.

(10) Patent No.: US 12,463,278 B2
(45) Date of Patent: Nov. 4, 2025

(54) POWER STORAGE DEVICE

(71) Applicant: TOYOTA JIDOSHA KABUSHIKI KAISHA, Toyota (JP)

(72) Inventors: Hiroyuki Nakayama, Okazaki (JP); Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 605 days.

(21) Appl. No.: 17/688,320

(22) Filed: Mar. 7, 2022

(65) Prior Publication Data

US 2022/0328919 A1    Oct. 13, 2022

(30) Foreign Application Priority Data

Mar. 31, 2021   (JP) .................................. 2021-060591

(51) Int. Cl.
*H01M 50/211*       (2021.01)
*H01M 10/04*        (2006.01)
(Continued)

(52) U.S. Cl.
CPC ..... *H01M 50/211* (2021.01); *H01M 10/0413* (2013.01); *H01M 10/613* (2015.04);
(Continued)

(58) Field of Classification Search
None
See application file for complete search history.

(56) References Cited

U.S. PATENT DOCUMENTS

| 11,139,525 B2 * | 10/2021 | Schuessler .......... H01M 50/264 |
| 2005/0069759 A1 * | 3/2005 | Shimamura ......... H01M 50/317 |
| | | 429/61 |

(Continued)

FOREIGN PATENT DOCUMENTS

| DE | 102017201692 A1 * | 8/2018 | .............. H01M 2/10 |
| DE | 102019205777 A1 * | 10/2020 | .............. B60L 50/64 |

(Continued)

OTHER PUBLICATIONS

Machine English translation of DE-102017201692-A1, Schuelke, A (Year: 2018).*

(Continued)

*Primary Examiner* — Ryan S Cannon
*Assistant Examiner* — Karen J. Armstrong
(74) *Attorney, Agent, or Firm* — Sughrue Mion, PLLC (57) ABSTRACT

A power storage device includes power storage cells stacked in one direction, a case for accommodating the power storage cells, and a restriction unit placed in the case and restricting a relative displacement of each power storage cell to the case in the one direction. The restriction unit shows a first modulus of elasticity when each power storage cell is displaced relative to the case at a first velocity and shows a second modulus of elasticity when each power storage cell is displaced relative to the case at a second velocity in the one direction. The first velocity is a relative velocity of each power storage cell to the case when each power storage cell expands, the second velocity is higher than the first velocity, and the second modulus of elasticity is higher than the first modulus of elasticity.

5 Claims, 6 Drawing Sheets

(51) Int. Cl.
  *H01M 10/613*  (2014.01)
  *H01M 50/105*  (2021.01)
  *H01M 50/183*  (2021.01)
  *H01M 50/609*  (2021.01)

(52) U.S. Cl.
  CPC ....... *H01M 50/105* (2021.01); *H01M 50/183* (2021.01); *H01M 50/609* (2021.01)

(56) References Cited

U.S. PATENT DOCUMENTS

| | | | |
|---|---|---|---|
| 2017/0352850 A1* | 12/2017 | Nagane | H01M 50/236 |
| 2020/0127246 A1* | 4/2020 | Choi | H01M 50/178 |
| 2020/0176745 A1* | 6/2020 | Lee | H01M 50/569 |
| 2020/0343498 A1 | 10/2020 | Schuessler et al. | |

FOREIGN PATENT DOCUMENTS

| | | | | |
|---|---|---|---|---|
| JP | 2007-165698 A | 6/2007 | | |
| JP | 5039866 B2 * | 10/2012 | ........... | H01M 2/105 |
| JP | 2013-229266 A | 11/2013 | | |
| JP | 2017-33676 A | 2/2017 | | |
| JP | 2020-61210 A | 4/2020 | | |
| JP | 2020-72005 A | 5/2020 | | |
| WO | 2012/081173 A1 | 6/2012 | | |

OTHER PUBLICATIONS

Machine English translation of DE-102019205777-A1, Schussler et. al. (Year: 2020).*

* cited by examiner

POWER STORAGE DEVICE

This nonprovisional application is based on Japanese Patent Application No. 2021-060591 filed on Mar. 31, 2021 with the Japan Patent Office, the entire contents of which are hereby incorporated by reference.

BACKGROUND

Field

The present disclosure relates to a power storage device.

Description of the Background Art

A power storage device including a plurality of power storage cells has conventionally been known. For example, Japanese Patent Laying-Open No. 2013-229266 discloses a battery module including a plurality of batteries stacked in one direction and a housing that surrounds the plurality of batteries. Each battery is a rectangular laminate-type battery with a laminated film as its exterior. An electrode tab formed of a thin metallic plate is pulled out from the center of each of the opposite ends, which are the short sides, of each battery.

SUMMARY

In the battery device disclosed in Japanese Patent Laying-Open No. 2013-229266, the case may expand along with the expansion of each battery, resulting in damage to the case.

In contrast, when each battery is allowed to be displaced relative to the case, each battery may resonate as the power storage device vibrates.

An object of the present disclosure is to provide a power storage device that can reduce damage to a case during expansion of a power storage cell and also reduce resonance of the power storage cell.

A power storage device according to an aspect of the present disclosure includes a plurality of power storage cells stacked in one direction, a case for accommodating the plurality of power storage cells, and a restriction unit placed in the case and restricting a relative displacement of each of the plurality of power storage cells to the case in the one direction. The restriction unit shows a first modulus of elasticity when each of the plurality of power storage cells is displaced relative to the case at a first velocity and shows a second modulus of elasticity when each of the plurality of power storage cells is displaced relative to the case at a second velocity in the one direction. The first velocity is a relative velocity of each of the plurality of power storage cells to the case when each of the plurality of power storage cells expands, the second velocity is higher than the first velocity, and the second modulus of elasticity is higher than the first modulus of elasticity.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiments of the present disclosure will be described with reference to the drawings. The same or corresponding elements in the drawings have the same reference characters allotted in the figures referenced below.

Embodiment 1

Figure 1:
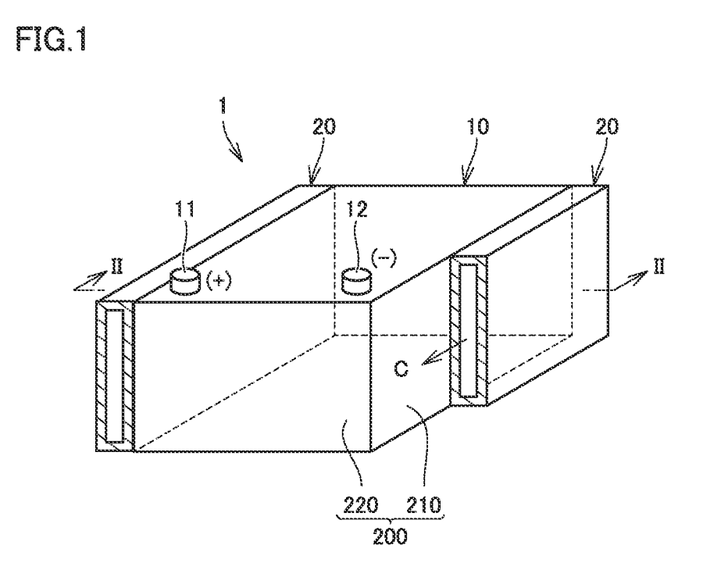
FIG. 1 is a perspective view schematically showing a configuration of a battery pack including a power storage device according to Embodiment 1 of the present disclosure.
Figure 2:
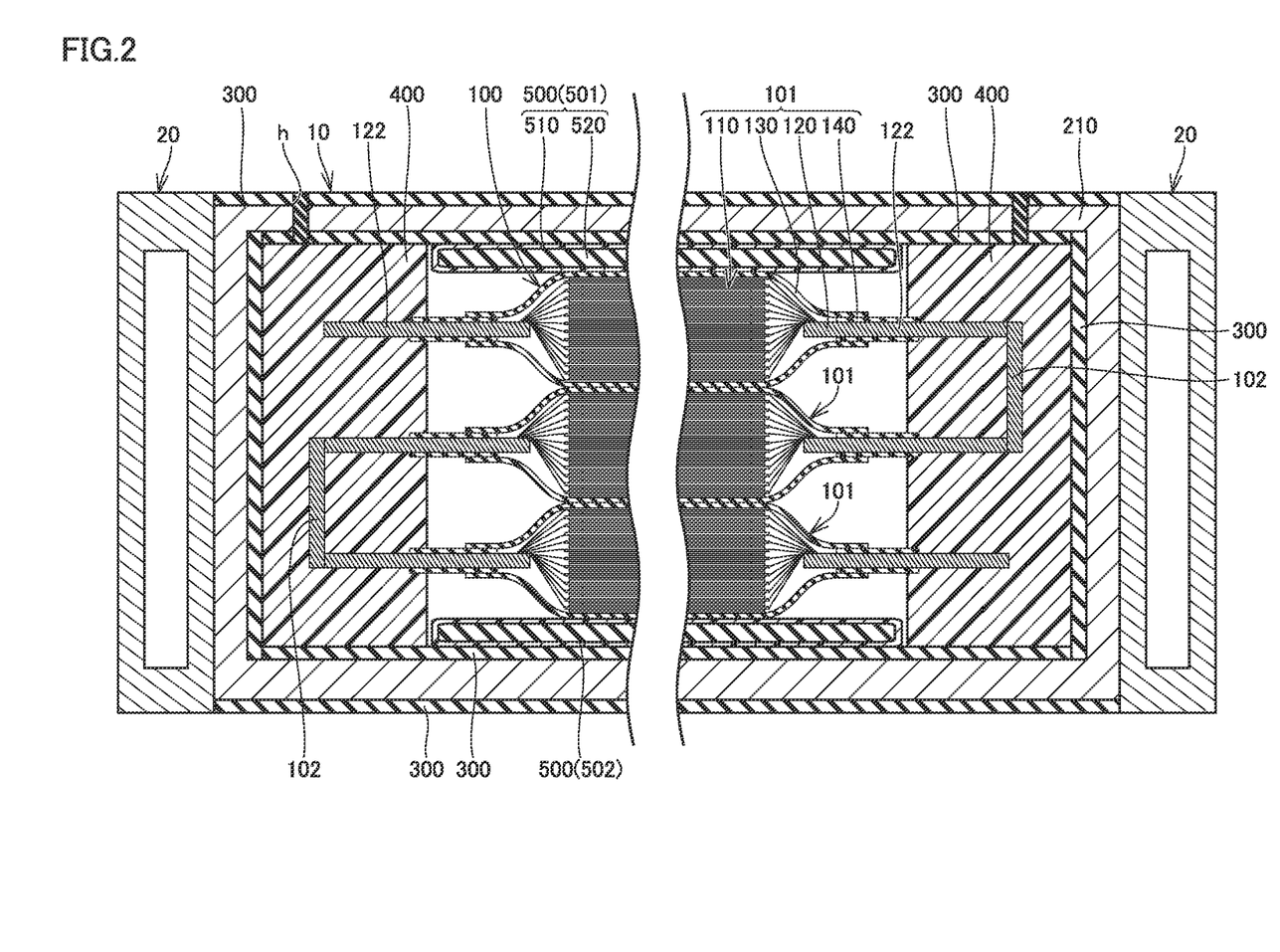
FIG. 2 is a sectional view taken along the line II-II in FIG. 1.

FIG. 1 is a perspective view schematically showing a configuration of a battery pack including a power storage device of Embodiment 1 of the present disclosure. FIG. 2 is a sectional view taken along the line II-II in FIG. 1. A battery pack 1 is mounted on, for example, an electric-powered vehicle such as a battery electric vehicle.

As shown in FIGS. 1 and 2, battery pack 1 includes a power storage device 10 and a cooling device 20. Cooling device 20 is a device that cools power storage device 10. Cooling device 20 is placed to be in contact with a lateral portion of power storage device 10. As shown in FIG. 1, cooling device 20 is configured to allow a cooling medium (such as water) C to flow therein. FIG. 1 shows a state in which a part of cooling device 20 is missing.

As shown in FIG. 1, power storage device 10 includes a pair of external terminals 11, 12. External terminal 11 is a positive electrode terminal, and external terminal 12 is a negative electrode terminal. As shown in FIG. 2, power storage device 10 includes a power storage module 100, a case 200, an insulating sheet 300, a filling portion 400, and a restriction unit 500.

Figure 3:
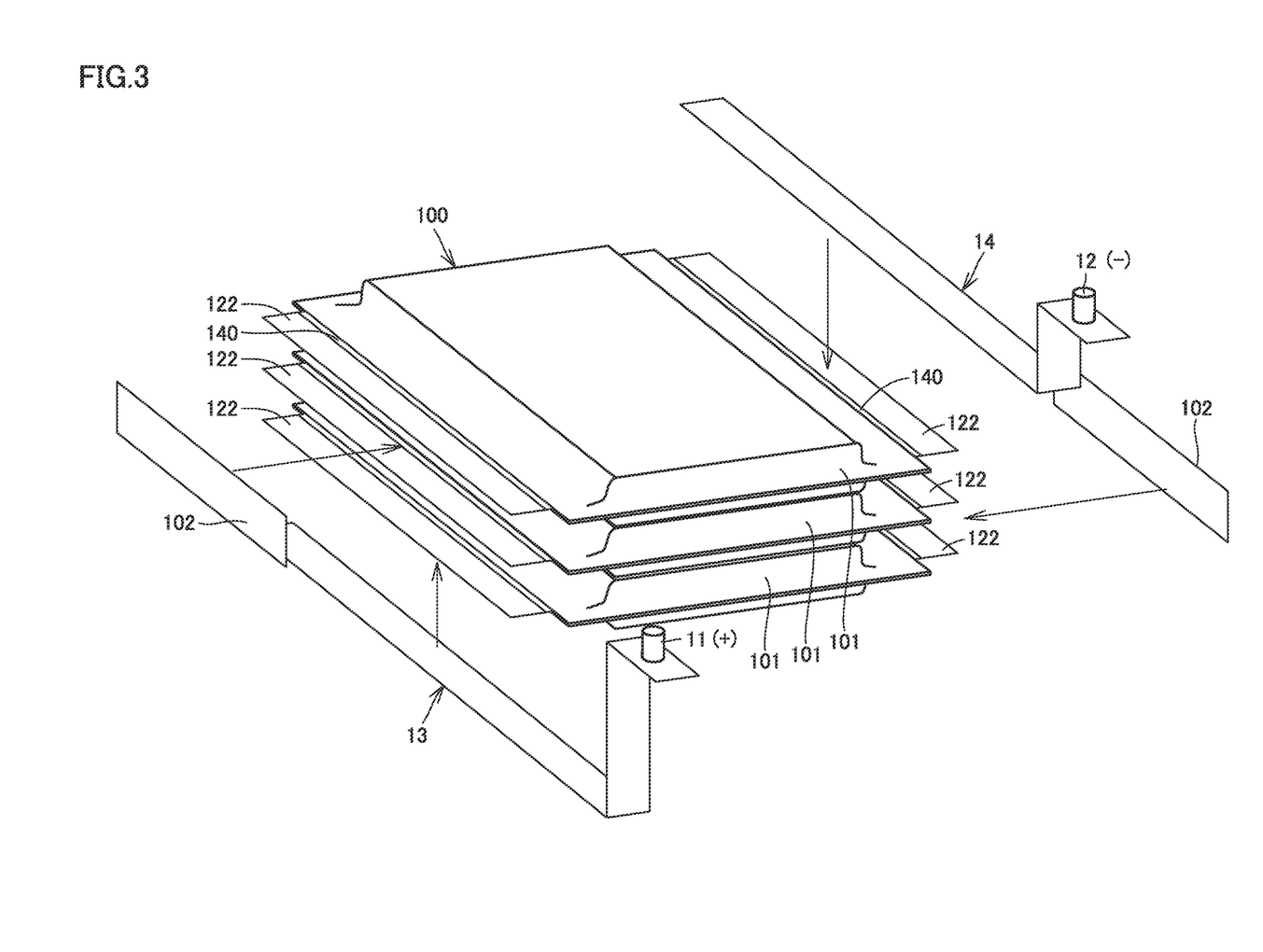
FIG. 3 is an exploded perspective view schematically showing a configuration of a power storage module.

FIG. 3 is an exploded perspective view schematically showing a configuration of a power storage module. As shown in FIGS. 2 and 3, power storage module 100 includes at least one power storage cell 101. In the present embodiment, power storage module 100 includes a plurality of power storage cells 101. Power storage cells 101 are stacked in one direction (the vertical direction in FIG. 1). Although FIGS. 2 and 3 show three power storage cells 101, the number of power storage cells 101 is not particularly limited. An example of power storage cell 101 is a lithium ion battery.

Power storage cell 101 is a so-called laminate-type cell. Specifically, power storage cell 101 includes a plurality of electrode bodies 110, a current collector plate 120, a laminated film 130, an adhesive member 140, and an electrolyte solution (not shown). Power storage cell 101 may be formed of an all-solid-state battery having a solid electrolyte in place of a separator and an electrolyte solution.

Electrode bodies 110 are stacked in one direction. Electrode bodies 110 include a positive electrode sheet and a negative electrode sheet. A separator is placed between the positive electrode sheet and the negative electrode sheet. An end of each electrode body 110 is electrically connected to current collector plate 120.

Laminated film 130 covers electrode bodies 110 and a part of current collector plate 120. Laminated film 130 is filled with an electrolyte solution (not shown).

As shown in FIGS. 2 and 3, current collector plate 120 includes protrusions 122 protruding from laminated film 130. Protrusions 122 are connected to one another by a bus bar 102 such that power storage cells 101 are electrically connected in series.

As shown in FIG. 3, protrusion 122 of power storage cell 101 placed at an end on one side in a direction is connected with a bus bar 13 provided with external terminal 11, and protrusion 122 of power storage cell 101 placed at an end on the other side in the direction is connected with a bus bar 14 provided with external terminal 12.

Adhesive member 140 is a member that bonds laminated film 130 to current collector plate 120. Adhesive member 140 is made of an insulating material (such as a resin). Adhesive member 140 is shaped to protrude from laminated film 130. Specially, adhesive member 140 covers a part of protrusion 122.

Case 200 accommodates power storage module 100. Case 200 is made of a metal (such as aluminum). Case 200 includes a case body 210 and a closing plate 220, as shown in FIG. 1.

Case body 210 has an opening that opens in at least one direction. In the present embodiment, case body 210 is shaped into a square tube having a central axis extending in a direction orthogonal to a direction of stacking of power storage cells 101. Case body 210 is provided with an inlet h (see FIG. 2).

Closing plate 220 is welded to case body 210 so as to close the opening of case body 210. Closing plate 220 is shaped into a flat plate.

Cooling device 20 is provided to be in contact with an outer lateral surface of case body 210. In other words, cooling device 20 is provided to be in contact with case 200 in the direction orthogonal to the direction of stacking of power storage cells 101.

Insulating sheet 300 covers an inner surface of case body 210 and an inner surface of closing plate 220. Insulating sheet 300 may cover an upper surface and a lower surface of case body 210, as shown in FIG. 2.

Filling portion 400 is made of an insulating material. Preferably, filling portion 400 is made of a thermally conductive material. Filling portion 400 is formed by injecting the material (in the present embodiment, a potting material) into case 200 through inlet h of case 200.

Filling portion 400 covers the tip of protrusion 122, as shown in FIG. 2. Tip covering portion 410 entirely covers protrusion 122 together with adhesive member 140. Filling portion 400 may cover adhesive material 140 and an end of laminated film 130.

Preferably, filling portion 400 entirely covers bus bars 102, 13, 14. Preferably, filling portion 400 is in contact with insulating sheet 300 provided on the inner surface of case body 210 and insulating sheet 300 provided on the inner surface of closing plate 220. As a result, a relative displacement of power storage module 100 to case 200 is reduced.

Restriction unit 500 is placed in case 200. Restriction unit 500 is placed between power storage module 100 and case body 210. Power storage device 10 of the present embodiment includes a first control unit 501 placed between an upper surface of power storage module 100 and case body 210, and a second control unit 502 placed between a lower surface of power storage module 100 and case body 210, as shown in FIG. 2. Any one of first control unit 501 and second control unit 502 may be omitted.

Restriction unit 500 restricts a relative displacement of power storage module 100 to case 200 in the direction of stacking of power storage cells 101. Restriction unit 500 shows a first modulus of elasticity when each power storage cell 101 is displaced relative to case 200 at a first velocity, and shows a second modulus of elasticity, which is higher than the first modulus of elasticity, when each power storage cell 101 attempts to be displaced relative to case 200 at a second velocity.

The first velocity is a relative velocity of each power storage cell 101 to case 200 when each power storage cell 101 of power storage module 100 expands. The second velocity is a relative velocity of each power storage cell 101 to case 200 and is higher than the first velocity. The second velocity is, for example, a relative velocity of each power storage cell 101 to case 200 when power storage device 10 or battery pack 1 vibrates.

As shown in FIG. 2, restriction unit 500 includes an accommodation bag 510 and a liquid 520.

Accommodation bag 510 accommodates liquid 520 in a hermetically sealed state. Accommodation bag 510 is formed of a flexible resin material or the like.

Liquid 520 fills accommodation bag 510. Liquid 520 is made of a material having dilatancy characteristics (such as a liquid including a resin). The material having dilatancy characteristics shows the first modulus of elasticity when each power storage cell 101 is displaced relative to case 200 at the first velocity, that is, when the material receives a first force from each power storage cell 101 in expansion of each power storage cell 101. The material having dilatancy characteristics shows the second modulus of elasticity when each power storage module 100 attempts to be displaced relative to case 200 at the second velocity, that is, when the material receives a second force, which is higher than the first force, from each power storage cell 101 in vibration of each power storage device 10.

In other words, restriction unit 500 allows a relative displacement of power storage module 100 to case 200 at the first velocity and restricts a relative displacement of power storage module 100 to case 200 at the second velocity.

As described above, in power storage device 10 of the present embodiment, when each power storage cell 101 expands, that is, when each power storage cell 101 is displaced relative to case 200 at the first velocity, restriction unit 500 shows a relatively low first modulus of elasticity, and thus, expansion of each power storage cell 101 is absorbed by the elastic deformation of restriction unit 500. Contrastingly, when each power storage cell 101 is displaced relative to case 200 at the second velocity, such as when power storage device 10 vibrates, restriction unit 500 shows a relatively high second modulus of elasticity, and thus, the relative displacement of power storage module 100 to case 200 is restricted, thereby reducing resonance of power storage module 100.

In the present embodiment, current collector plate 120 and bus bar 102 are cooled by cooling device 20 via filling portion 400 made of a thermally conductive material from the lateral portion of case 200 in the direction orthogonal to the direction of stacking. Current collector plate 120 and bus bar 102 are made of metal, and accordingly, power storage module 100 is cooled effectively.

Further, the heat of power storage cell 101 in contact with restriction unit 500 is transferred via restriction unit 500 to case body 210, and accordingly, power storage cell 101 is cooled effectively.

Figure 4:
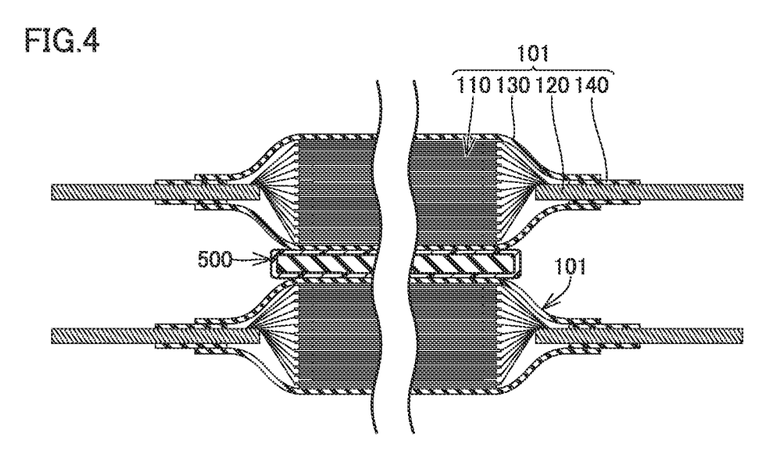
FIG. 4 is a sectional view schematically showing a variation of the arrangement of a control unit.

In the embodiment described above, restriction unit 500 may be placed between a pair of power storage cells 101 adjacent to each other as shown in FIG. 4.

Embodiment 2

Figure 5:
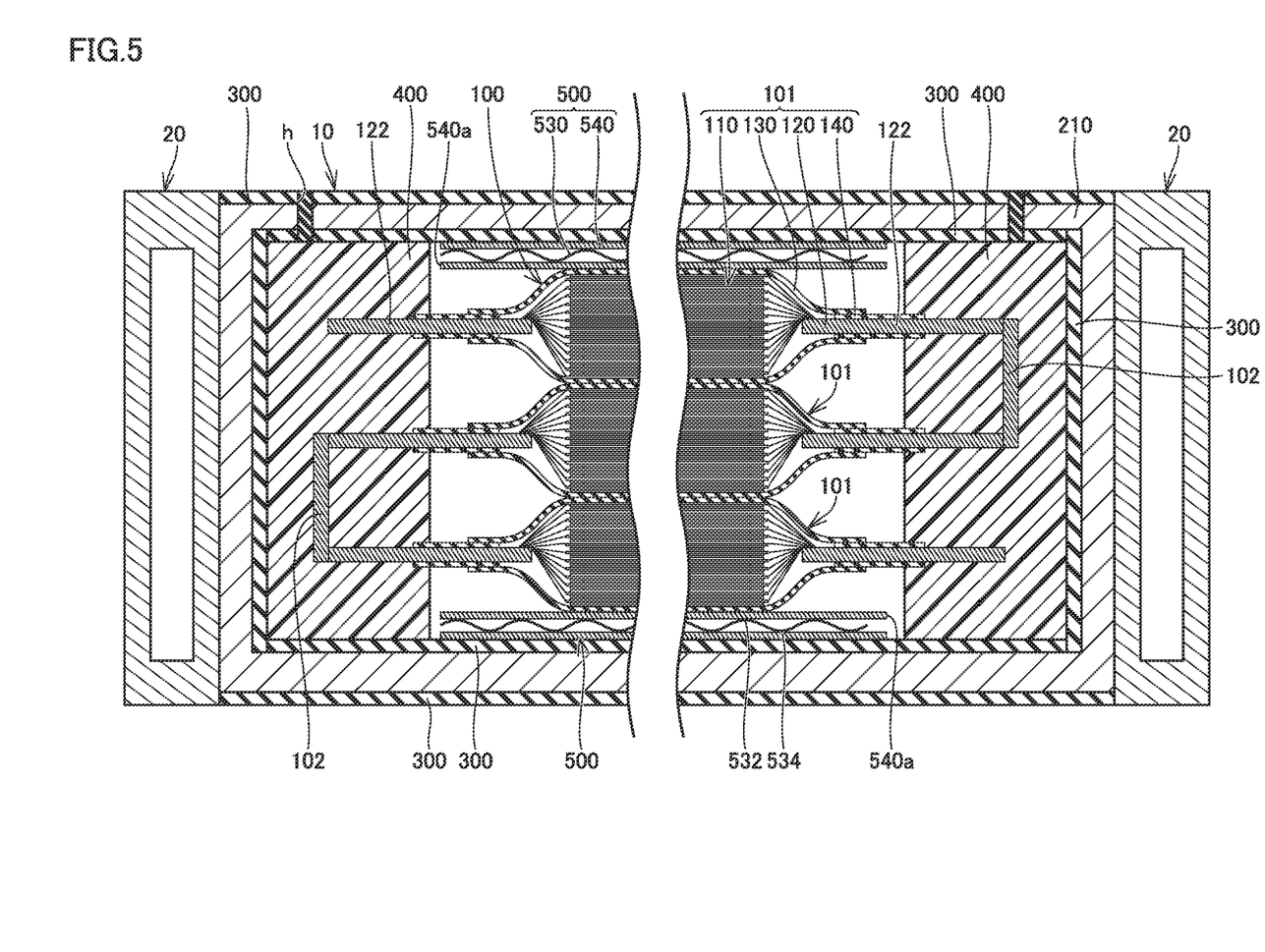
FIG. 5 is a sectional view schematically showing a configuration of a power storage device according to Embodiment 2 of the present disclosure.

Next, power storage device 10 according to Embodiment 2 of the present disclosure will be described with reference to FIG. 5. FIG. 5 is a sectional view schematically showing a configuration of a power storage device of Embodiment 2 of the present disclosure. Embodiment 2 will describe only a difference from Embodiment 1, and will not repeat the description on the same structure, and function and effect as those of Embodiment 1.

In the present embodiment, restriction unit 500 includes a corrugated plate 530. Preferably, for example, corrugated plate 530 has a thermal conductivity of not less than 10 W/mK. Corrugated plate 530 includes a plurality of first curved portions 532 and a plurality of second curved portions 534.

Each first curved portion 532 is curved to project to one side in one direction and is shaped to extend in an orthogonal direction (the direction orthogonal to the plane of sheet of FIG. 5) orthogonal to the one direction.

Each second curved portion 534 is curved to project to the other side in the one direction and is shaped to extend in the orthogonal direction.

As shown in FIG. 5, first curved portions 532 and second curved portions 534 are placed alternately in a direction orthogonal to both of the one direction and the orthogonal direction.

Corrugated plate 530 elastically deforms such that each curved portion 532, 534 becomes flatter when each power storage cell 101 is displaced relative to case 200 at the first velocity, that is, when corrugated plate 530 receives the first force from each power storage cell 101 in expansion of each power storage cell 101. At this time, corrugated plate 530 shows the first modulus of elasticity.

Corrugated plate 530 ensures flexural rigidity as each curved portion 532, 534 is shaped to extend in the orthogonal direction, and accordingly, corrugated plate 530 restricts the relative displacement of power storage module 100 to case 200 when power storage module 100 attempts to be displaced relative to case 200 at the second velocity, that is, when corrugated plate 530 receives the second force greater than the first force from each power storage cell 101 in vibration of power storage device 10. At this time, corrugated plate 530 shows the second modulus of elasticity.

In the present embodiment, restriction unit 500 may further include a pair of plate members 540. The pair of plate members 540 are placed to be in contact with corrugated plate 530 from both sides in the one direction. The surface of each plate member 540, which is in contact with corrugated plate 530, is formed to be flat. Each plate member 540 functions to reduce the frictional force generated in corrugated plate 530 when corrugated plate 530 is elastically deformed such that each curved portion 532, 534 becomes flatter. Preferably, for example, each plate member 540 has a thermal conductivity of not less than 10 W/mK. Preferably, an end 540a of at least plate member 540 of the pair of plate members 540, which is in contact with power storage cell 101, is spaced away from filling portion 400.

In such a manner, in expansion of each power storage cell 101, the expansion of each power storage cell 101 is absorbed as corrugated plate 530 elastically deforms such that each curved portion 532, 534 becomes flatter, whereas the flexural rigidity of corrugated plate 530 is ensured as each curved portion 532, 534 is shaped to extend in the orthogonal direction. Thus, the relative displacement of power storage module 100 to case 200 in vibration of power storage device 10 is restricted effectively.

Restriction unit 500 includes the pair of plate members 540, thereby reducing a friction occurring in corrugated plate 530 as corrugated plate 530 elastically deforms in expansion of each power storage cell 101.

End 540a of plate member 540 in contact with power storage cell 101 is spaced away from filling portion 400, and thus, plate member 540 is effectively displaced relative to case 200 in one direction in expansion of each power storage cell 101.

Embodiment 3

Figure 6:
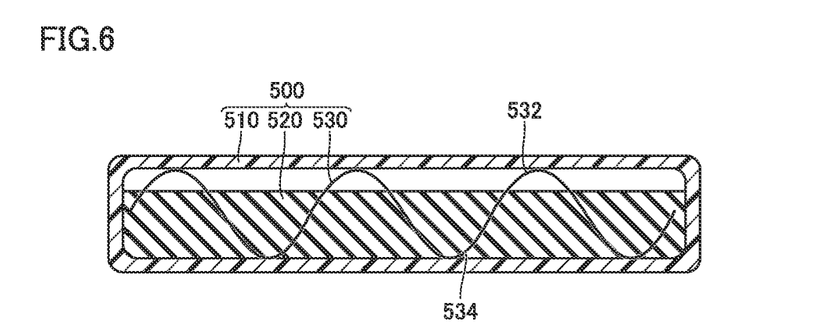
FIG. 6 is a sectional view schematically showing a configuration of a restriction unit in a power storage device of Embodiment 3 of the present disclosure.

Next, restriction unit 500 in power storage device 10 of Embodiment 3 of the present disclosure will be described with reference to FIG. 6. FIG. 6 is a sectional view schematically showing a configuration of a restriction unit in a power storage device of Embodiment 3 of the present disclosure. Embodiment 3 will describe only a difference from Embodiment 1, and will not repeat the description on the same structure, and function and effect as those of Embodiment 1.

In the present embodiment, restriction unit 500 further includes a corrugated plate 530 placed in accommodation bag 510. Corrugated plate 530 has the same configuration as that of Embodiment 2. An amount of liquid 520 that fills accommodation bag 510 is set to be smaller than that of Embodiment 1.

In such a manner, the flexural rigidity of restriction unit 500 is increased further by liquid 520 and corrugated plate 530, thereby reducing resonance of power storage module 100 more reliably.

It will be appreciated by a person skilled in the art that the exemplary embodiments described above provide specific examples of the following aspects.

A power storage device in the embodiments described above includes a plurality of power storage cells stacked in one direction, a case for accommodating the plurality of power storage cells, and a restriction unit placed in the case and restricting a relative displacement of each of the plurality of power storage cells to the case in the one direction. The restriction unit shows a first modulus of elasticity when each of the plurality of power storage cells is displaced relative to the case at a first velocity and shows a second modulus of elasticity when each of the plurality of power storage cells is displaced relative to the case at a second velocity in the one direction. The first velocity is a relative velocity of each of the plurality of power storage cells to the case when each of the plurality of power storage cells expands, the second velocity is higher than the first velocity, and the second modulus of elasticity is higher than the first modulus of elasticity.

In this power storage device, the restriction unit shows a relatively low first modulus of elasticity when each power storage cell expands, that is, when each power storage cell is displaced relative to the case at the first velocity, and accordingly, the expansion of each power storage cell is absorbed by the elastic deformation of the restriction unit. In contrast, the restriction unit shows a relatively high second modulus of elasticity when each power storage cell is displaced relative to the case at the second velocity, such as when the power storage device vibrates, and accordingly, the relative displacement of the plurality of power storage cells to the case is restricted, thus reducing resonance of the plurality of power storage cells.

The restriction unit may be made of a material having dilatancy characteristics.

The restriction unit may include a corrugated plate including a plurality of first curved portions and a plurality of second curved portions. Each of the plurality of first curved portions may be curved to project to one side in the one direction and shaped to extend in an orthogonal direction orthogonal to the one direction. Each of the plurality of second curved portions may be curved to project to the other side in the one direction and shaped to extend in the orthogonal direction. The plurality of first curved portions and the plurality of second curved portions may be placed alternately in a direction orthogonal to both of the one direction and the orthogonal direction.

In this aspect, in expansion of each power storage cell, the expansion of each power storage cell is absorbed as the corrugated plate elastically deforms such that each curved portion becomes flatter, whereas the flexural rigidity of the corrugated plate is ensured as each curved portion is shaped to extend in the orthogonal direction. Accordingly, the relative displacement of each power storage cell to the case when the power storage device vibrates is restricted effectively.

The restriction unit may further include a pair of plate members placed to be in contact with the corrugated plate from both sides in the one direction. A surface of each of the pair of plate members, which is in contact with the corrugated plate, may be formed to be flat.

In this aspect, a friction occurring in the corrugated plate as the corrugated plate elastically deforms in expansion of each power storage cell is reduced.

The restriction unit may further include an accommodation bag that accommodates the corrugated plate in a hermetically sealed state, and a liquid that fills the accommodation bag.

In this aspect, the flexural rigidity of the restriction unit is further increased by the liquid, thereby reducing resonance of each power storage cell more reliably.

In this case, the liquid is preferably made of a material having dilatancy characteristics.

The restriction unit may be placed between the power storage cells adjacent to each other.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery pack comprising:
  a power storage device; and
  a cooling device,
  the power storage device including
    a plurality of power storage cells stacked in one direction of the power storage device;
    a case for accommodating the plurality of power storage cells; and
    an insulating sheet covering an inner surface of the case;
    a bus bar electrically connecting a pair of power storage cells adjacent to each other among the plurality of power storage cells;
    a filling portion made of an insulating and a thermally conductive material and filled in the case; and
    a restriction unit placed in the case and restricting a relative displacement of each of the plurality of power storage cells to the case in the one direction,
  the cooling device being placed to be in contact with an outer lateral surface of the case in an orthogonal direction that is orthogonal to the one direction,
  each of the a plurality of power storage cells including
    a plurality of electrode bodies, each including a positive electrode sheet and a negative electrode sheet,
    a current collector plate being electrically connected to each end of the electrode body,
    a laminated film covering the plurality of electrode bodies and a part of the current collector plate, wherein the current collector plate includes a protrusion protruding from the laminated film, and
    an adhesive member that bonds the laminated film to the current collector plate such that a portion of the adhesive member protrudes from the laminated film and covers a part of the protrusion of the current collector plate,
  the restriction unit showing a first modulus of elasticity when each of the plurality of power storage cells is displaced relative to the case at a first velocity and showing a second modulus of elasticity when each of the plurality of power storage cells is displaced relative to the case at a second velocity in the one direction, the first velocity being a relative velocity of each of the plurality of power storage cells to the case when each of the plurality of power storage cells expands, the second velocity being higher than the first velocity, the second modulus of elasticity being higher than the first modulus of elasticity, and
  wherein:
  the restriction unit directly contacts the laminated film of an outermost power storage cell, among the plurality of power storage cells, in the one direction, and directly contacts the insulating sheet in the one direction,
  the filling portion directly contacts the insulating sheet in the one direction and in the orthogonal direction,
  the bus bar electrically connects a pair of the protrusions adjacent to each other,
  the filling portion covers a tip of the portion of the adhesive member that protrudes from the laminated film, a tip of the protrusions, and an entire area of the bus bar, and
  ends of the restriction unit in the orthogonal direction are spaced away from the filling portion.

2. The battery pack according to claim 1, wherein the restriction unit is made of a material having dilatancy characteristics, and wherein the restriction unit includes a first restriction unit and a second restriction unit, wherein the first restriction unit is disposed between the outermost power storage cell located in a lowermost position of the stack of the plurality of power storage cells and the insulating sheet, and the second restriction unit is disposed between another outermost power storage cell located in an uppermost position of the stack of the plurality of power storage cells and the insulating sheet.

3. The battery pack according to claim 1, wherein
  the restriction unit includes a corrugated plate including a plurality of first curved portions and a plurality of second curved portions, each of the plurality of first curved portions is curved to project to one side in the one direction and is shaped to extend in the orthogonal direction orthogonal to the one direction, each of the plurality of second curved portions is curved to project to another side in the one direction and is shaped to extend in the orthogonal direction, and the plurality of first curved portions and the plurality of second curved portions are placed alternately in a direction orthogonal to both of the one direction and the orthogonal direction.

4. The battery pack according to claim 3, wherein the restriction unit further includes a pair of plate members placed to be in contact with the corrugated plate from both sides in the one direction, and a surface of each of the pair of plate members, which is in contact with the corrugated plate, is formed to be flat.

5. The battery pack according to claim 1, wherein the case includes an inlet on a side of the case that is located in the one direction of the case, through which the insulating and thermally conductive material of the filling portion is injected into the case.

* * * * *